United States Patent Office 3,442,936
Patented May 6, 1969

3,442,936
ACETOXY-TERTIARY ALKYL-AMINE OXIDES
Walter M. Budde, Jr., Prior Lake, Minn., assignor to Ashland Oil & Refining Company, Ashland, Ky., a corporation of Kentucky
No Drawing. Filed July 26, 1965, Ser. No. 474,993
Int. Cl. C07c 93/16
U.S. Cl. 260—490          2 Claims

ABSTRACT OF THE DISCLOSURE

A class of detergent-grade amine oxides are provided by oxidizing an acetylated derivative of a 2-hydroxy (higher) alkyl, di (lower) alkyl teritiary amine.

---

This invention relates to N-oxides of acyl derivatives of 1-dialkylamino-2-alkanols.

Briefly, according to one aspect of this invention, a new class of compounds is provided, which compounds are N-oxides of acyl derivatives of amino-substituted secondary alkanols, said acyl derivatives having the general formula:

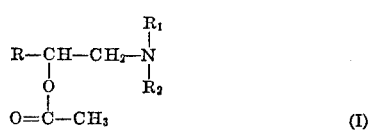

$$\text{(I)}$$

where $R_1$ and $R_2$ are the same or different alkyl groups having 1 to 4 carbon atoms and R is an alkyl group having from 8 to 16 carbon atoms.

These acyl derivatives are prepared by reacting amino-substituted secondary alkanols with an appropriate acylating agent such as acetyl chloride, acetic acid, or anhydride thereof The amino-substituted secondary alkanols can be prepared by reacting 1,2-epoxides of long, straight- or branched-chain, terminally unsaturated mono-olefins, such as those having 10 to 18 carbon atoms, per molecule, with a secondary amine such as dimethylamine, diethylamine, dipropylamine, methyl ethylamine, ethyl butylamine, etc.

The 1,2-epoxides used in preparing such amino secondary alkanols can, in turn, be prepared by the epoxidation of said terminal olefins with an aliphatic peracid, such as peracetic acid. Such terminal olefins can be used singly or in admixture and they can be straight-chain or branched-chain terminal olefins. Long, straight-chain terminal mono-olefins can be obtained from petrochemical sources, for example, by cracking of petroleum waxes or by polymerization of ethylene using Ziegler catalysts such as trialkylaluminum. Representative 1-olefins which can be used to prepare the 1,2-epoxide precursors include 1-decene, 1-hendecene, 1-dodecene, 1-hexadecene, 1-octadecene, 1-eicosene, and the like, including mixtures thereof. The table sets forth a description and specifications for some long chain, terminal mono-olefin mixed fractions commercially available from petrochemical sources which can be epoxidized to prepare the precursor 1,2-epoxides of said amino secondary alkanols. Where such terminal mono-olefins are used as the initial precursors of the amino-substituted alkanols, the acyl derivative products prepared in this invention by acylation of the latter will be mixtures of said derivatives, the various carbon chain lengths of the beta-substituted group attached to the nitrogen atom corresponding to that of the olefin fraction.

TABLE

| | Fractions | | | | | |
|---|---|---|---|---|---|---|
| | C9–C11 | C11–C15 | C12–C14 | C15–C20 | C15–C18 | C20+ |
| Total straight chain alpha olefins, percent | 87 | 87 | 93.5 | 86 | 88.8 | 69 |
| Carbon No. distribution, percent: | | | | | | |
| C8 | 1 | | | | | |
| C9 | 22 | | | | | |
| C10 | 55 | 1 | 0.7 | | | |
| C11 | 21 | 13 | | | | |
| C12 | 1 | 24 | 41.3 | | | |
| C13 | | 24 | | | | |
| C14 | | 24 | 31.9 | | | |
| C15 | | 13 | | 1 | 1 | |
| C16 | | 1 | 25.6 | 12 | 27 | |
| C17 | | | | 19 | 29 | |
| C18 | | | | 18 | 28 | |
| C19 | | | | 18 | 15 | |
| C20 | | | | 17 | | |
| C20–16 | | | 0.5 | 15 | | 77 |
| C26–42 | | | | | | 23 |
| Specific gravity, 20° C., g./ml | 0.747 | 0.769 | 0.769 | 0.790 | 0.784 | 0.865 |

Representative amino secondary alkanols which are acylated according to this invention include: 1-dimethylamino-2-decanol; 1-dimethylamino-2-hendecanol; 1-(N-methyl-N-ethylamino)-2-dodecanol; 1-dipropylamino-2-tridecanol; 1-(N-ethyl-N-butyl)-amino-2-tetradecanol.

The acylation reaction of this invention can be carried out by using stoichiometric amounts of the amino alkanol and acylating agent, though an excess up to 50%, preferably 2–5% excess, of the amino alkanol can be used if desired. The acylating reaction is carried out batchwise or in a continuous manner at a reaction temperature sufficient to maintain the reactants in the liquid state, and generally reaction temperatures from room temperature (25° C.) up to 200° C. will be adequate for this purpose. The acylating reaction can be carried out at atmospheric or autogenous or higher pressures. The use of a catalyst is not necessary where the acylating reactant is an anhydride, but where it is an acid, catalysts such as sulfuric acid and para-toluene sulfonic acid can be used.

The acylating reaction of this invention produces water-insoluble acyl derivatives in quantitative yields. The acyl derivative product can be distilled or otherwise purified.

In accordance with this invention, the acyl derivatives described above are oxidized to form the corresponding N-oxides, which have the following general formula:

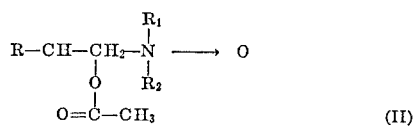

$$\text{(II)}$$

where $R_1$, $R_2$ and R are as defined above with respect to general Formula I.

The N-oxides are prepared according to this invention by oxidizing said acyl derivatives of said amino-substituted secondary alkanols at temperatures in the range of 40–80° C. with an oxidizing agent, such as hydrogen peroxide. The hydrogen peroxide used in carrying out this oxidation is preferably aqueous hydrogen peroxide having a concentration of about 27–98 weight percent, preferably 50–90 weight percent, and typically 50 weight percent. The amount of hydrogen peroxide used is preferably 10–25 percent in excess of the stochiometric amount. Water or a lower alkanol such as methanol, ethanol, propanol, or butanol can be added if desired during the course of the oxidation reaction to keep the reaction mixture fluid. The N-oxide products will generally be water-soluble and can be used, for example, in detergent formulations and as wetting or dispersing agents, or can be used as intermediates in chemical synthesis.

Representative N-oxides of the acyl derivatives of amino secondary alkanols which can be made according to this invention include the N-oxides of any of the aforementioned acyl derivatives, such as the N-oxide of the acetic acid ester of 1-dimethyl-2-decanol.

The objects and advantages of this invention are further illustrated by the following example, but it should be understood that the particular reactants and amounts thereof, reaction conditions, and other details described in this example should not be construed to unduly limit this invention.

EXAMPLE

In this example, 279 grams of 1-dimethylamino-2-alkanol (prepared by reacting dimethylamine with the 1,2-epoxide of a $C_{12}$–$C_{16}$ terminal olefin fraction) was reacted with 112 grams of acetic anhydride and 3 grams of acetic acid in a 1-liter glass flask, the ensuing exothermic reaction raising the reaction mixture to a maximum temperature of 71° C. At the end of the reaction, when the temperature of the reaction mixture was 38° C., 18 grams of water were added, and the reaction mixture was stripped under vacuum to 100° C. The resulting acetic acid ester of 1-dimethylamino-2-alkanol had an acid value of 4.82. Two hundred grams of this product was then reacted with 466 grams of 50 percent hydrogen peroxide at a temperature of 54–59° C., after which 458 grams of water were added. The resulting N-oxide of said acetic acid ester of 1-dimethylamino-2-alkanol contained 3.39 weight percent free amine, which was neutralized with 5.35 grams of acetic acid.

I claim:
1. A tertiary amine oxide having the formula:

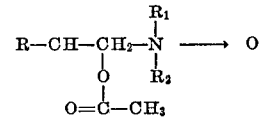

wherein R represents a $C_{10}$–$C_{14}$ alkyl group and $R_1$ and $R_2$ are the same or different alkyl groups having from 1–4 carbon atoms.

2. A tertiary amine oxide in accordance with claim 1 wherein $R_1$ and $R_2$ are methyl.

References Cited

UNITED STATES PATENTS

| | | | |
|---|---|---|---|
| 1,150,253 | 8/1915 | Davis | 260—477 |
| 2,586,238 | 2/1952 | Lytton | 260—490 |

OTHER REFERENCES

Migrdichian: Organic Synthesis, vol. I, Reinhold Publishing Co., New York.

JAMES A. PATTEN, *Primary Examiner.*

EDWARD GLEIMAN, *Assistant Examiner.*

U.S. Cl. X.R.

252—152, 357; 260—584